United States Patent Office 3,321,435
Patented May 23, 1967

3,321,435
STABILIZATION OF HIGH MOLECULAR WEIGHT POLYCARBONATES WITH BORON COMPOUNDS
Gerhard Fritz, Ulrich Curtius, and Ludwig Bottenbruch, Krefeld-Bockum, Hermann Schnell, Krefeld-Urdingen, and Werner Göller, Krefeld-Bockum, Germany, assignors to Farbenfabriken Bayer Aktiengesellschaft, Leverkusen, Germany, a corporation of Germany
No Drawing. Filed Mar. 6, 1964, Ser. No. 350,117
Claims priority, application Germany, Mar. 9, 1963, F 39,209
5 Claims. (Cl. 260—45.7)

This invention relates to a process for the stabilization of high molecular weight, linear thermoplastic polycarbonates.

High molecular weight, linear thermoplastic polycarbonates are produced generally by the reaction of aromatic dihydroxy compounds such as, dihydroxy-diaryl alkanes, -sulphones, -sulphides, -ethers or other aromatic dihydroxy compounds or their mixtures or of mixtures of the mentioned dihydroxy compounds with aliphatic, cycloaliphatic or araliphatic dihydroxy compounds with phosgene, bis-chlorocarbonic acid esters of the mentioned dihydroxy compounds or diesters of carbonic acid.

For example, there may be mentioned, as aliphatic dihydroxy compounds; diethylene glycol, tri-ethylene glycol, polyethylene glycol, thiodiglycol, ethylene dithiodiglycol, the di-, and polyglycols produced from propylene-oxide-1,2, o, m, or p-xylene glycol, butanedion-1,4, pentanediol-1,5, hexanediol-1,6, octanediol-1,8, octanediol-1,5, and decanediol-1,10.

As cycloaliphatic dihydroxy compounds: cyclohexanediol-1,4, cyclohexanediol-1,2, 2,2-(4,4′-dihydroxy-dicyclohexylene)-propane, and 2,6-dihydroxydecahydronaphthalene, as aromatic dihydroxy compounds: hydroquinone, resorcinol, 4,4′-dihydroxydiphenyl, 1,4-dihydroxynaphthalene, 1,6-dihydroxynaphthalene, 2,6-dihydroxynaphthalene, 1,5-dihydroxynaphthalene, dihydroxyanthracene, and o, m, p-hydroxybenzyl alcohol.

Preferred classes of aromatic dihydroxy compounds are the di-monohydroxy arylene sulphones and particularly the dimonohydroxy arylene alkanes, such as 4,4′-dihydroxydiphenylene sulphone,
3,3′-dihydroxydiphenylene sulphone,
4,4′-dihydroxy-2,2′-dimethyl diphenylene sulphone,
4,4′-dihydroxy-3,3′-dimethyldiphenylene sulphone,
4,4′-dihydroxy-2,2′-diethyl-diphenylene sulphone,
4,4′-dihydroxy-3,3′-diethyldiphenylene sulphone,
4,4′-dihydroxy-2,2′-di-tert.-butyl-diphenylene sulphone,
4,4′-dihydroxy-3,3′-di-tert.-butyl-diphenylene sulphone and
2,2′-dihydroxy-1,1′-dinaphthalene sulphone,
4,4′-dihydroxy-diphenylene-methane and -propane-2,2.

Thermal processing, such as injection molding, of these polycarbonates to obtain good quality resin parts has heretofore required the moisture content of the polycarbonates to be as low as possible before thermal processing. Therefore, in general, these polycarbonates are processed with the careful exclusion of moisture and are dried immediately before molding by heating to temperatures of up to about 200° C. so that the water content of the polycarbonates before processing amounts to less than about 0.01% by weight of the polycarbonates. For example, the water content of a Bisphenol A polycarbonate granulate under conditions of 60% relative humidity and room temperature is about 0.2% by weight.

If a water-containing polycarbonate is melted during thermal processing without special drying operations and the polycarbonate is subsequently subjected to high temperatures then damage to the polycarbonate occurs at these necessary high temperatures which damage is due to hydrolytic degradation caused by the pressure of water. This damage is manifested by the formation of carbon dioxide. The carbon dioxide gas bubbles which appear make it practically impossible to produce satisfactory, non-brittle, molded bodies, such as films, fibers, bristles and the like. Furthermore, the presence of water causes a considerable decrease of the average molecular weight of the polycarbonates, and thus a deterioration of the mechanical properties of the molded bodies produced therefrom.

It has now been found that the damage occurring during the thermal processing of high molecular weight, linear thermoplastic polycarbonates which have not been sufficiently dried, can be prevented and polycarbonates with an improved heat stability are obtained by adding to the polycarbonates, before melting a compound selected from the group consisting of boron acids, their anhydrides and esters, pentavalent phosphorus acids, and their anhydrides and esters.

Polycarbonates, for example, polycarbonate granulates, pellets and the like stabilized by the novel additives of this invention can be used without special precautions against the influence of moisture. The polycarbonates treated in accordance with this invention can be stored and then melted during processing without the polycarbonates suffering a deleterious decomposition upon melting and without a deterioration occurring to the mechanical properties of the molded parts produced therefrom. Furthermore, polycarbonates stabilized according to the process of the present invention show an improved stability to thermal stress so that the polycarbonates can be heated for a prolonged period of time at temperatures above the melting point without discolorations occurring.

Representative of the novel additive compounds of this invention are acids of boron, such as ortho-, meta- and tetra-boric acid, alkyl boric acids of the formulas $R_2BOH$ and $RB(OH)_2$; esters of boric acid such as those represented by the formula $(RO)_3B$ wherein R may be alkyl, aryl or aralkyl and including such esters as tri-n-octyl borate, tridecyl borate, trioctadecyl borate, tri-(6-hydroxyhexyl)-borate, tricyclohexyl borate, tri-($\alpha$-phenylethyl)-borate, tribenzyl borate, triphenyl borate, tricresyl borate, and tri-(p-tert.-butylphenyl)-borate; anhydrides of boron acids such as boron trioxide and boron phosphate.

Included among the phosphorus compounds useful in the process of this invention are the pentavalent phosphorus acids such as phosphoric acid, phosphonic acid, phosphinic acid, phosphenic acid, phosphoranoic acid, phosphoranedioic acid, phosphoranetrioic acid, phosphoranetetroic acid, and phosphoranepentoic acid; monoaryl esters of orthophosphoric acid, such as monophenyl phosphate, monocresyl phosphate, mono-(p-tert.-butyl-phenyl)-phosphate, also diaryl esters of phosphoric acid, such as diphenyl phosphate, dicresyl phosphate, di-(p-tert.-butyl-phenyl)-phosphate, also trialkyl esters of phosphoric acid, especially those which split off olefines at the working up temperatures of the polycarbonates, such as triethyl phosphate, trioctyl phosphate, tridecyl phosphate, tri-(6-hydroxyhexyl)-phosphate, as well as polyphosphoric acids which may be partially esterified, such as hexametaphosphoric acid, tetraphenyl pyrophosphate, the reaction product from 1 mol diphenyl phosphate and 1 mol monophenyl phosphate and the reaction product from 1 mol triphenyl phosphate and 1 mol phosphorus pentaoxide.

The amounts of the additive stabilizers used can vary within wide limits and are primarily dependent upon the quantity of the starting materials used for the production of the polycarbonates, upon the composition of the polycarbonates, and upon the intended use of the polycarbonates. In general, it is sufficient when about 0.001 to about 2% by weight of the stabilizers are added to the polycarbonates. The addition of about 0.002 to about 0.05% by weight is preferred.

The stabilizers used in accordance with this present invention can be added to the polycarbonate in a variety of methods. Thus, for example, it is possible to mix a polycarbonate granulate with the stabilizer, then melt the mixture and thereafter process the mixture into a granulate or directly into molded bodies. It is also possible to dissolve the polycarbonate granulate in an organic solvent, mix the resulting solution with the stabilizer and then thermally process this solution. It is especially advantageous, when producing polycarbonates by the reaction of dihydroxy compounds with phosgene or bis-chlorocarbonic acid esters in the presence of an acid-binding agent and organic solvents for the polycarbonate formed, to mix the resultant polycarbonate solution with the stabilizers to be used according to the present invention and to work up these solutions, such as by extrusion, into, for example, polycarbonate granulates. Finally, the stabilizers can also be added, towards the end or after termination of the polycondensation, to the reaction mixtures formed by the transesterification of dihydroxy compounds with carbonic acid esters, care being taken to ensure a uniform distribution by stirring. In this latter case, it can be advantageous to introduce the stabilizer into the melt in the form of a concentrated mixture with the polycarbonate.

The following examples are given for the purpose of illustrating the present invention. The values given for the relative viscosity of the polycarbonates are measured on 0.5% solutions of the polycarbonates in methylene chloride at about 20° C.

The invention is further illustrated by the following examples in which the parts are by weight unless otherwise indicated.

*Example 1*

A mixture of about 7000 parts Bisphenol A, about 6700 parts diphenyl carbonate (2 mol% excess) and about 0.02 part of the disodium salt of Bisphenol A is melted, in a 25-liter autoclave provided with stirrer and made of chromium-nickel-molybdenum steel, at a pressure of 100 mm. Hg. under nitrogen and heated for about 2 hours at about 180° C. to about 200° C. The temperature is then increased for a period of about 1 hour at about 280° C. and the pressure gradually decreased to about 0.5 mm. Hg. About 5780 parts of phenol is thereby distilled off.

The reaction melt is then mixed with 0.39 part (0.005%) metaphosphoric acid and fully condensed under a pressure of 0.5 mm. Hg at about 280° C. to about 300° C. The melt is subsequently extruded in the form of bristles and these comminuted to a granulate. The granulates of polycarbonate obtained have a relative viscosity of 1.315 and are almost colorless. As one measure of the stability of this polycarbonate, a portion of the granulates is heated at about 300° C. for about 6 hours under nitrogen. No alteration of the color was apparent.

Several samples of the above prepared polycarbonate granulate of relative viscosity 1.315, after air-moisture exposure at room temeperature are processed into molded articles in a conventional injection molding machine. After molding, the relative viscosity of these samples was determined to be 1.306. The relative viscosity of the same type of polycarbonate granulate sample dried to a water content of less than 0.01%, prior to molding, amounts to 1.314 after processing in the same injection molding machine.

Following the procedure of this example except for the addition of the stabilizer, a polycarbonate granulate is obtained with a relative viscosity of 1.322. Samples of the granulate without the additive, after being subjected to air moisture exposure at room temperature are processed into molded articles in a conventional injection molding machine. After molding, a bubble-containing product is obtained having a relative viscosity of 1.229. A sample of the same additive free granulate was dried to a moisture content of less than 0.01% and molded, resulting in a bubble-free molded article having a viscosity of 1.301.

*Example 2*

Following the procedure of Example 1, about 7000 parts Bisphenol A, about 6700 parts diphenyl carbonate and about 0.02 part of the disodium salt of Bisphenol A are reacted until about 5800 parts phenol have distilled off. The temperature is then increased to 300° C. and the melt is fully condensed under a pressure of 0.3 mm. Hg.

Thereafter, about 78 parts of a polycarbonate of Bisphenol A containing about 1% metaphosphoric acid are added and stirred with the melt. The melt is subsequently extruded in the form of bristles and these are comminuted to a granulate. The polycarbonate obtained has a relative viscosity of 1.316 and is almost colorless.

Several samples of this granulate after air-moisture exposure at room temperature are processed in a conventional injection molding machine to produce molded shaped articles. The molded articles have a relative viscosity of 1.305, whereas the relative viscosity of a sample of the same polycarbonate granulate dried, prior to molding to a water content of less than 0.01 is 1.314 after molding.

*Example 3*

To the melt of the polycarbonate prepared according to the procedure of Example 2, there is added, with stirring, about 1.56 parts of phenyl metaphosphate. The melt is subsequently extruded in the form of bristles which are comminuted to a granulate. The polycarbonate obtained has a relative viscosity of about 1.340 and a pale yellowish color. A test sample at about 300° C. for about 4 hours under nitrogen shows no alteration of the color.

After melting the above polycarbonate granulate of relative viscosity 1.340 in an air-moisture state in an extruder, the relative viscosity amounts to 1.325, whereas the relative viscosity of the same granulate, but dried to a water content of less than 0.01% amounts of 1.328 after processing in the same extruder.

*Example 4*

About 7000 parts Bisphenol A, about 6700 parts diphenyl carbonate and about 0.02 part of the sodium salt of Bisphenol A are melted according to the procedure of Example 1 and heated to about 180° C. to about 200° C. at a pressure of 100 mm. Hg. After distilling off about 4000 parts of phenol, the temperature is increased in the course of half an hour to about 250° C. and the pressure reduced to 0.2 mm. Hg. A further about 1700 parts phenol thereby distill off.

The melt is subsequent mixed with about 2.3 parts boric acid and stirred for about 4 hours at about 280° C. and a pressure of 10 mm. Hg. The polycondensation reaction is then completed at a pressure of 0.2 mm. Hg with a gradual increase of the temperature to about 305° C.

The reaction melt is subsequently extruded in the form of bristles and these comminuted to a granulate. The polycarbonate granulate obtained has a relative viscosity of 1.306 and is almost colorless.

Several samples of the thus prepared polycarbonate granulate are prepared after air-moisture exposure at room temeprature in an injection molding machine to form molded articles. The relative viscosity of the polycarbonate samples obtained was determined to be 1.301, whereas the relative viscosity of samples of the same polycarbonate, not subject to air-moisture amounted to 1.300 after an identical molding operation.

Example 5

The procedure of Example 4 was followed except that instead of 2.3 parts boric acid, about 7.8 parts boric acid tris-(6-hydroxyhexyl)-ester are used. The polycondensation reaction as described is completed after about 130 minutes. After extruding the melt in the form of bristles there is obtained a polycarbonate with a relative viscosity of 1.306, which, after molding in an air-moisture state, provides a bubble-free product with a relative viscosity of about 1.300 and which after molding in a dried state, provides a product with a relative viscosity of 1.305.

Example 6

The procedure of Example 4 is followed but with the addition of 0.75 part phosphoric acid monophenyl ester instead of about 0.39 part meta-phosphoric acid. After extruding the melt in the form of bristles and comminuting them to a granulate, there is obtained a granulate with a relative viscosity of 1.310 which after molding in an air-moisture state, provides a bubble-free produce with a relative viscosity of 1.288 and which after molding in a dried state provides a product with a relative viscosity of 1.300.

Example 7

About 2365 parts gaseous phosgene are introduced at about 25° C. within a period of about two hours, while stirring into a mixture of about 4540 parts Bisphenol A, about 110 parts p-tert.-butyl-phenyl, about 2320 parts sodium hydroxide, about 1900 parts water and about 35,000 parts methylene chloride. About 16 parts triethylamine are then added to the mix. After further stirring for about 1 hour, the methylene chloride phase is separated and consecutively washed with a dilute sodium hydroxide-solution, dilute acid and then with water until electrolyte-free.

About 0.5 part boron phosphate (about 0.01% of the polycarbonate) is stirred into the methylene chloride solution thus obtained. The solution is subsequently concentrated by evaporation of the methylene chloride. The product which gels at a solids content of about 30 to 35% is comminuted and dried at about 120° C. and 0.1 mm. Hg. until the weight is constant. The polycarbonate granulate obtained is almost colorless and has a relative viscosity of about 1.316.

If the polycarbonate granulate is melted and molded in an air-moisture state, then a bubble-free product is obtained with a relative viscosity of about 1.310 whereas the same polycarbonate dried prior to molding provides a product with a relative viscosity of 1.314.

If the procedure is carried out as stated above, but without the addition of the boron phosphate, a polycarbonate granulate is obtained with a relative viscosity of 1.317 which after exposure in an air-moisture state is extruded and provides a bubble-containing product with a relative viscosity of 1.265. The same granulate after being dried and then extruded (water content less than 0.01%) provides a bubble-free product with a relative viscosity of 1.314.

Example 8

The procedure of Example 7 was followed except that about 0.5 part meta phosphoric acid was added instead of the boron phosphate. There is obtained an almost colorless polycarbonate granulate with a relative viscosity of 1.312 which was subjected to air-moisture and then melted to provide a bubble-free product with a relative viscosity of 1.285 and which after several samples were dried and melted, provided a product with a relative viscosity of 1.297.

Example 9

The procedure of Example 7 was followed except that about 0.5 part phosphoric acid diphenyl ester was added instead of boron phosphate. There is obtained an almost colorless polycarbonate granulate with a relative viscosity of 1.314 which after being subjected to air-moisture and then melting provides a bubble-free product with a relative viscosity of 1.293 and which after being dried and then melted provides a product with a relative viscosity of 1.301.

Example 10

The procedure of Example 7 was followed except that about 0.5 part phosphoric acid triethyl ester was added instead of boron phosphate. There is obtained an almost colorless polycarbonate granulate with a relative viscosity of 1.305 which after melting in an air-moisture state, provides a bubble-free product with a relative viscosity of 1.280 and which after melting in a dried state, provides a product with a relative viscosity of 1.293.

Although the invention has been described in considerable detail for the purpose of illustration, it is to be understood that variations may be made therein by those skilled in the art without departing from the spirit of the invention and the scope of the claims.

What is claimed is:

1. A polycarbonate stabilized against hydrolytic degradation which comprises a mixture of a high molecular weight polycarbonate and a stabilizer selected from the group consisting of orthoboric acid, metaboric acid, tetraboric acid, alkylboric acids having the formulae $R_2BOH$ and $RB(OH)_2$, esters of boric acid having the formula $(RO)_3B$ and boron trioxide and boron phosphate wherein R in the foregoing formulae is selected from the group consisting of alkyl, aryl and aralkyl radicals.

2. The polycarbonate of claim 1 containing from about 0.001 to about 2% by weight of the stabilizer.

3. The polycarbonate of claim 1 wherein the stabilizer is tris-(6-hydroxyhexyl)borate.

4. The polycarbonate of claim 1 wherein the stabilizer is boric acid.

5. The polycarbonate of claim 1 wherein the stabilizer is boron phosphate.

References Cited by the Examiner

UNITED STATES PATENTS

| | | | |
|---|---|---|---|
| 3,027,349 | 3/1962 | Bahr et al. | 260—45.7 |
| 3,053,810 | 9/1962 | Griehl et al. | 260—77.5 |
| 3,186,961 | 6/1965 | Sears | 260—30.6 |

FOREIGN PATENTS

| | | |
|---|---|---|
| 1,240,228 | 7/1960 | France. |

DONALD E. CZAJA, *Primary Examiner.*

LEON J. BERCOVITZ, *Examiner.*

M. J. WELSH, *Assistant Examiner.*